Sept. 3, 1963　　　　A. KUEHN III　　　　3,102,961
ENGINE STARTER AND TEMPERATURE CONTROL APPARATUS
FOR AUTOMOTIVE VEHICLES
Filed Nov. 4, 1960　　　　　　　　　　5 Sheets-Sheet 2

FIG. 2

INVENTOR.
ANDREW KUEHN III
BY
Braddock and Braddock
ATTORNEYS

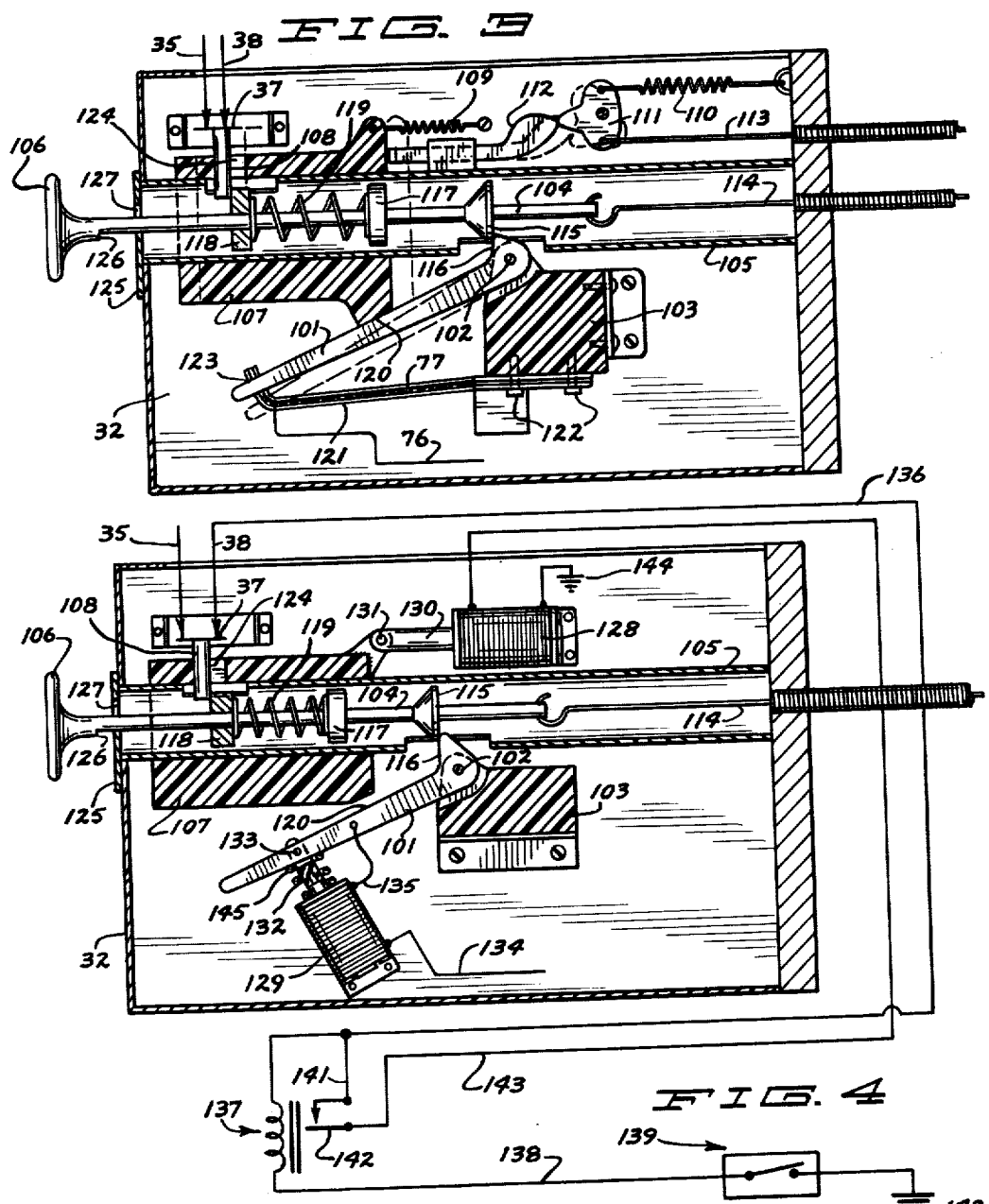

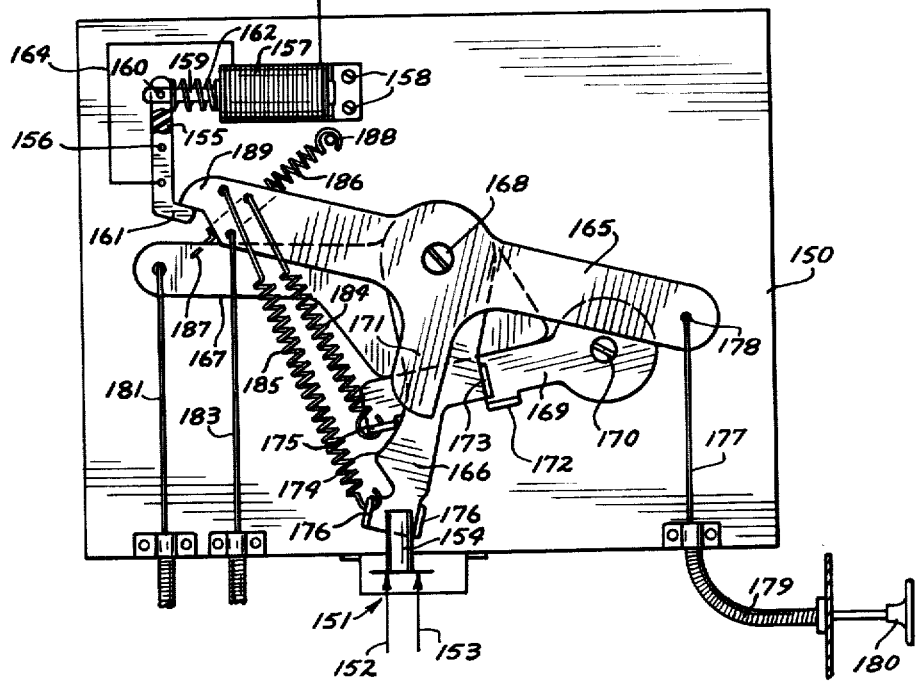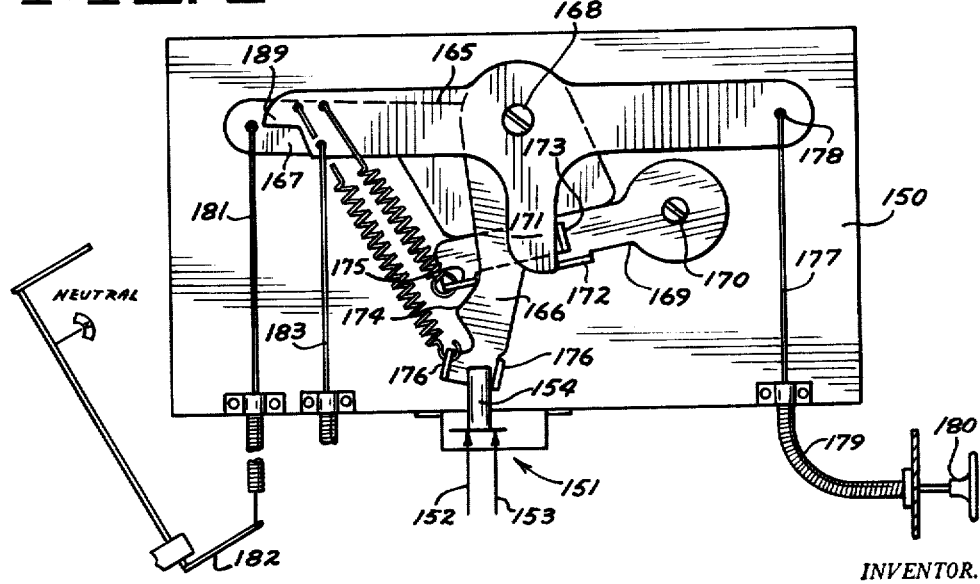

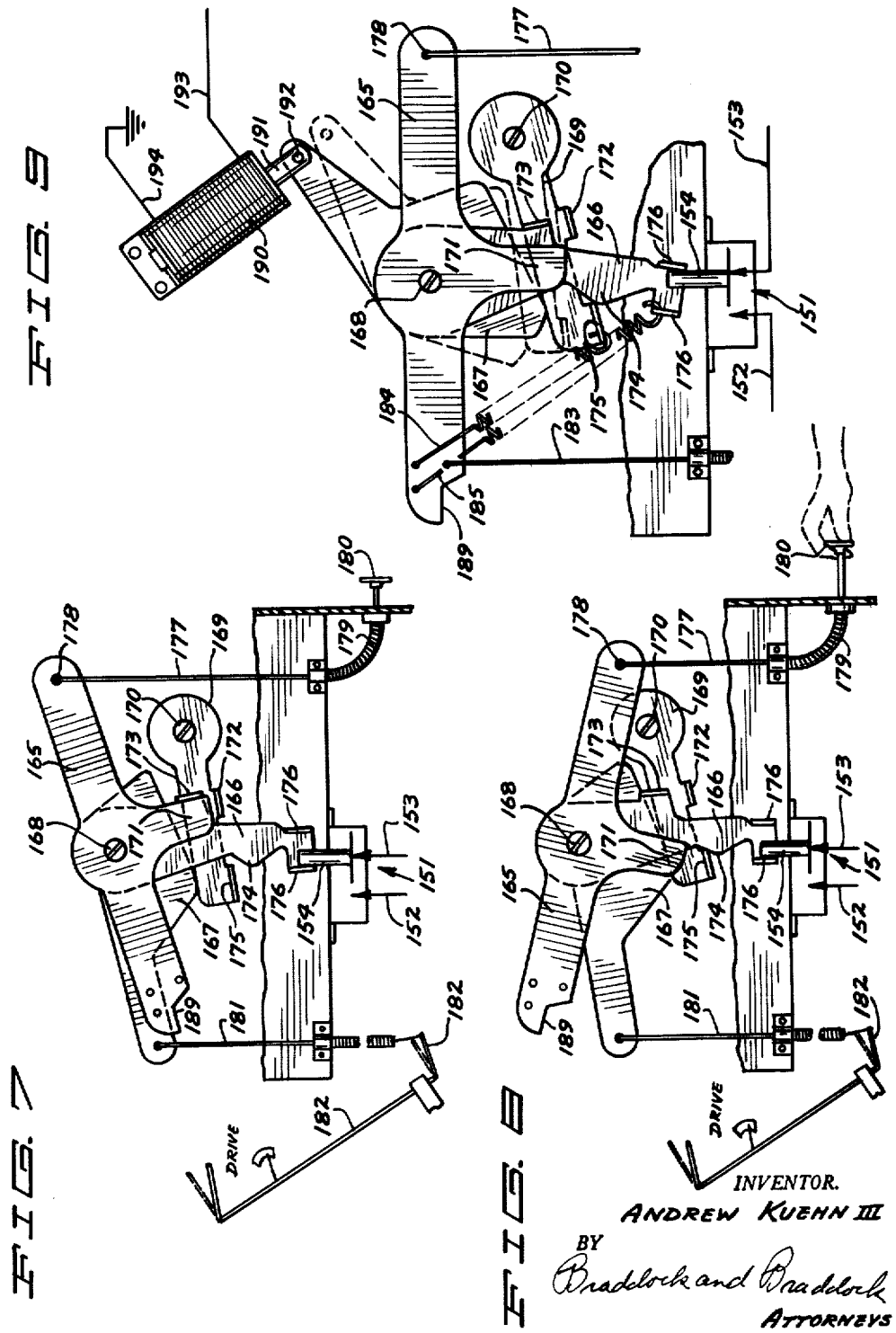

United States Patent Office 3,102,961
Patented Sept. 3, 1963

3,102,961
ENGINE STARTER AND TEMPERATURE CONTROL APPARATUS FOR AUTOMOTIVE VEHICLES
Andrew Kuehn III, St. Paul, Minn., assignor to Systematics, Inc., St. Paul, Minn., a corporation of Minnesota
Filed Nov. 4, 1960, Ser. No. 67,320
13 Claims. (Cl. 290—37)

The invention herein has relation to an engine starter and temperature control apparatus for automotive vehicles of the character wherein the internal combustion engines of the automotive vehicles are set in operation in response to alterations in temperature, or at pre-determined times, and caused to cease operating in response to temperature alterations.

The purpose of the invention is to provide an apparatus for commencing operation of an internal combustion engine of an automotive vehicle and causing the engine to cease operating in response to alteration in temperature wherein will be incorporated various novel and improved features and characteristics of construction devised to render the apparatus an improvement over apparatuses of the same general character heretofore known. As disclosed in the drawings and hereinafter described, commencement of operation of the internal combustion engine can be in response to lowering of the temperature thereof and cessation of operation of said internal combustion engine can be in response to elevation of the temperature thereof; or commencement of operation of the internal combustion engine can be in response to lowering of the temperature of a passenger or interior space of the automotive vehicle and cessation of operation of said internal combustion engine can be in response to elevation of the temperature of said passenger or interior space; or commencement of operation of the internal combustion engine can be in response to elevation of the temperature of the passenger space of an automotive vehicle and cessation of operation of said internal combustion engine can be in response to lowering of the temperature of said passenger or interior space. It will become apparent that initiation of actuation of the apparatus can be accomplished in response to phenomena other than falling or rising temperature, such as by timing mechanism or remote control, and that said apparatus can be installed to start and stop operation of an internal combustion engine in response only to falling and rising temperature thereof, or only to falling and rising temperature of a passenger or interior space of an automotive vehicle as in cold weather, or only to rising and falling temperature of said passenger or internal space as in warm weather. Stated otherwise, an apparatus made according to principles of the invention, while equipped to be set up in a single system to be capable of preventing freezing of the cooling medium of an internal combustion engine and of maintaining the passenger or interior space of an automotive vehicle at sufficiently high and low temperatures to be suitable for comfort in winter and summer, respectively, need not be so set up.

In the accompanying drawings forming a part of this specification,

FIG. 2 is a diagrammatic view disclosing details of an electrical system of said apparatus;

FIG. 3 is an enlarged sectional view of pre-setting and interlocking mechanism of the apparatus;

FIG. 4 is a view corresponding generally with the disclosure of FIG. 3 but showing a pre-setting and interlocking mechanism of modified construction which can be employed as part of the apparatus in lieu of the pre-setting and interlocking mechanism illustrated in said FIG. 3;

FIG. 5 is an elevational view of a further modified construction of pre-setting and interlocking mechanism suitable for use as part of an apparatus made according to the invention;

FIGS. 6, 7 and 8 are elevational views corresponding with the disclosure of FIG. 5 but showing parts in different positions; and FIG. 9 is an elevational view of a still further modified construction of pre-setting and interlocking mechanism capable of employment as part of the apparatus in lieu of the pre-setting and interlocking mechanism illustrated in FIGS. 5 to 8, inclusive.

Figure 1:
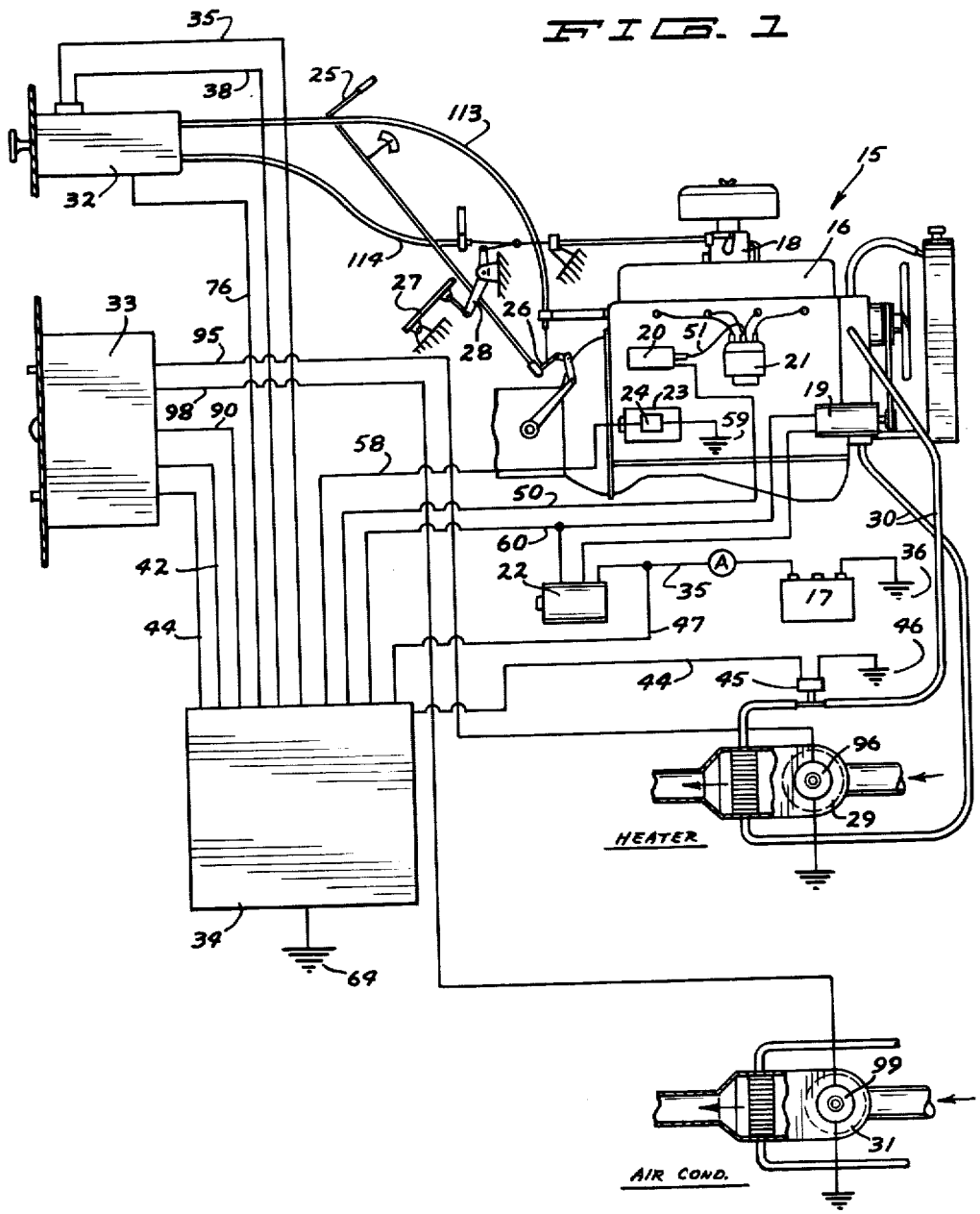
FIG. 1 is a diagrammatic view of an apparatus made according to the invention as when applied to use in connection with an automotive vehicle and an internal combustion engine and other accessories thereof.

FIG. 1 of the drawings discloses a fragment of an automotive vehicle 15 on which are, or are to be, supported customary elements, for rendering the automotive vehicle operable, as follows: an internal combustion engine 16, a battery 17, a carburetor 18, a generator 19, an ignition coil 20, a distributor 21, a voltage regulator 22, a starter 23, a starter solenoid 24, a gear shift 25, a gear shift linkage 26, an accelerator pedal 27, an accelerator linkage 28, a heater blower 29, hose connections 30 from a water jacket for the engine to said heater blower and an air conditioning blower system 31 to be equipped with usual clutch circuits. The figure also discloses a first unit 32 including a pre-setting and interlocking mechanism of the apparatus, disclosed in detail in FIG. 3, a second unit 33 including some of operative elements of said apparatus and a third unit 34 including others of operative elements of the apparatus, as well as electrical connections between said units and customary accessories of the automotive vehicle.

In FIG. 2, where details of an electrical system of or for the apparatus are disclosed, a lead wire 35 extends from the battery 17, grounded at 36, to a master switch 37; a lead wire 38 extends from the master switch to an element 39 having a positive coefficient of resistance change with rising temperature; a bulb as disclosed; a lead wire 40 extends from the element 39 to a primary relay 41; a lead wire 42 extends from the primary relay to an indicator bulb 43 in the second unit 33; a lead wire 44 extends from the indicator bulb to a block thermostat 45 grounded at 46; a lead wire 47 extends from the lead wire 35 to switches 48 and 49 controlled by the primary relay 41; a lead wire 50 extends from the switch 48 to the ignition coil 20; a lead wire 51 extends from the ignition coil to the distributor 21, grounded at 52; a lead wire 53 extends from the switch 49 to a movable contact 54 under the control of a secondary relay 55 and engageable with fixed contacts 56 and 57; a lead wire 58 extends from the fixed contact 56 to the starter solenoid 24, grounded at 59; a lead wire 60 extends from the generator 19, grounded at 61, through a ballast 62 and the coil of the secondary relay 55 to a switch 63, grounded at 64, controlled by the primary relay; a lead wire 65 extends from the lead wire 44 to a switch 66 controlled by said primary relay; a lead wire 67 extends from the switch 66 to the lead wire 42; a lead wire 68 extends from the lead wire 67 to a heating resistor 69 and a resistor 70 having negative coefficient of resistance change with change of temperature; a thermistor as shown; in adjacent relation to each other and connected in parallel; a lead wire 71 extends from the elements 69 and 70 to a fixed contact 72 of a switch including a movable contact 73 controlled by the secondary relay 55 and connected to the lead wire 40; a lead wire 74 extends from a fixed contact 75, with which the movable contact 73 is engageable, to the lead wire 38; a lead wire 76 extends from the fixed contact 57 to an expansible and contractible resistance element 77 to be grounded as at 78; a switch 79, in the second unit 33, is for connecting the lead wire 44 with a lead wire 80 extending to a contact 81 of a switch also including contacts 82 and 83; a conductor bar 84 is for selectively connecting the contacts 81, 82 and 81, 83; a lead wire 85 extends from the contact 82 to a thermostat 86 adapted to close in response to fall of temperature, a lead wire 87 extends from the contact 83 to a thermostat 88 adapted to close in response to rise of temperature and said thermostats are grounded at 89; a lead wire 90 extends from the lead wire 76 to a contact 91 of a switch also including contacts 92 and 93; a conductor bar 94 is for selectively connecting the contacts 91, 92 and 91, 93; a lead wire 95 extends from the contact 92 to a heater blower motor 96, grounded at 97, and a lead wire 98 extends from the contact 93 to an air conditioning blower motor 99, grounded at 100.

The expansible and contractible resistance element 77 is a part of a pre-setting and interlocking mechanism of the apparatus disclosed in detail in FIG. 3. A latching arm 101 of said mechanism is pivotally mounted, as at 102, on an insulating block 103 thereof fixedly supported in the unit 32. An operating rod 104, longitudinally slidable in a tube 105 fixed in said unit, is rigid with a pull knob 106 accessible exteriorly of said tube. A cylindrical actuator 107 of insulating material, longitudinally slidable on the tube 105, slidably supports a movable contactor 108 of the master switch 37 to be engaged with and disengaged from fixed contactors thereof. More explicitly stated, said movable contactor is slidable longitudinally of the cylindrical actuator 107 in an elongated slot 124 therein. A first tension coil spring 109 is for urging said cylindrical actuator into engagement with a slidable actuator 112 of the apparatus, and a second tension coil spring 110 is for rotatably urging a pivoted cam 111 of the pre-setting and interlocking mechanism of said apparatus to situate said slidable actuator in the position in which shown in FIG. 3. A cable 113 extends from the pivoted cam 111 to the gear shift linkage 26 and a cable 114 extends from the operating rod 104 to the accelerator linkage 28. Said operating rod rigidly supports an annular protuberance providing a shoulder 115 engageable with a shoulder 116 provided by the latching arm 101, and a collar fixed on said operating rod is denoted 117. A bushing 118 is slidable on the operating rod, and a compression coil spring 119 on said operating rod retains the collar 117 and the bushing 118 in spaced relation.

The master switch 37 is to be capable of becoming closed in response to withdrawal of the pull knob 106, thus to cause the shoulder 115 to become engaged back of the shoulder 116, as in FIG. 3, but only when the pivoted cam 111 is situated to correspond with neutral position for the gear shift mechanism. In said FIG. 3 the cable 113 is assumed to be situated as when said gear shift mechanism is in neutral position, the pivoted cam 111 retaining the slidable actuator 112 at its farthest position toward the left, engaged with the adjacent end of the cylindrical actuator 107. Also in FIG. 3 the pull knob has been withdrawn to cause the bushing 118 to slide the movable contactor 108 in said cylindrical actuator to situate it in the closed condition of the master switch 37. The construction and arrangement will be such that the cable 113 will be actuated upon movement of the gear shift mechanism to any operative position thereof to rotate said pivoted cam thus to release said slidable actuator and permit the tension coil spring 109 to move the cylindrical actuator toward the right in said FIG. 3 to be ridable at 120 along the latching arm 101 thus to cause it to be rotated downwardly and release the shoulder 116 provided by said latching arm from the shoulder 115 provided by the protuberance on the operating rod 104. It will be evident that the master switch when closed as in FIG. 3 will become opened in response to placing the gear shift mechanism in any operative position, thus to actuate the cable 113 to rotate the pivoted cam 111. Also it will be evident that the tension coil spring 109 will retain the cylindrical actuator 107 in position to situate the shoulder 116 out of alinement with and thus clear of the shoulder 115 as long as the gear shift mechanism remains in an operative position. In short, the pull knob 106 can be actuated to close the master switch and retain it in closed condition only when the gear shift mechanism is in neutral position.

The expansible and contractible resistance element 77, attached to the lead wire 76, is secured between bi-metallic strips 121, elements of which have different co-efficients of expansion, and grounded, by way of latching arm 101, to the operating rod 104. Said bi-metallic strips are supported at 122 on the insulating block 103 and slidably interconnected at 123 with said latching arm. The construction and arrangement will be such that energization of the resistance element 77 will cause the bi-metallic strips 121 to become flexed or bent thus to rotate the latching arm downwardly to release the shoulder 116 from the shoulder 115 and break an energizing circuit for said resistance element thus to cause it to become de-energized.

Withdrawal of the pull knob 106, while the gear shift 25 is in neutral position and the master switch 37 is closed, to position where the shoulder 115 provided by the operating rod 104 becomes locked back of the shoulder 116 provided by the latching arm 101 is for pre-setting the accelerator linkage to provide a carburetor setting higher than for idling speed of the engine and appropriate for cold starting. A stop plate 125 is for retaining the operating rod 104 in a position of higher speed than idling and lower than cold starting for the carburetor. The construction and arrangement will be such that a spring means (not shown) of or for the accelerator linkage will pull-in said operating rod upon its release by the latching arm 101, and a shoulder 126 provided by the operating rod is for engagement with a surface of said stop plate bounding an aperture 127 therethrough. Said operating rod is to be manually turned to release the shoulder 126 from the stop plate thus to permit said spring means to return the carburetor to idling speed position.

Supposing the apparatus is to be employed only to start operation of the internal combustion engine 16 in response to falling of the temperature thereof and to cease operation of said engine in response to rising of its temperature, the pull knob 106 will be withdrawn to cause the master switch 37 to be closed and the switch 79 will be set in open position as in FIG. 2 of the drawings. Whenever thereafter the block thermostat 45 shall have become closed, in response to fall of temperature, to connect the lead wire 44 to ground, a main circiut extending from the battery 17 through the lead wire 35 to the master switch 37, thence through the lead wire 38, the resistance bulb 39, the lead wire 40 and the primary relay 41 to the lead wire 42, and thence through the indicator bulb 43, the lead wire 44 and the block thermostat 45 to ground, will be energized. A circuit parallel to said primary relay and including the heating resistor 69 and thermistor 70, traced from the primary relay through the lead wires 67 and 68, said heating resistor and thermistor and the lead wire 71, the contacts 72 and 73 and the lead wire 40 back to said primary relay, will become energized in respose to energization of said primary relay. Also, energization of the primary relay will cause the switches 48, 49, 63 and 66 to become closed. Closing the switch 48 will complete an energizing circuit from the battery 17 to the ignition coil 20 by way of said lead wire 35 and the lead wires 47 and 50; closing the switch 49 will complete an energizing circuit from said battery to the starter solenoid 24 by way of said lead wires 35 and 47, the lead wire 53, the contacts 54 and 56 (engaged when the secondary relay 55 is deenergized) and the lead wire 58; closing the switch 63 will complete a circuit from the armature of the generator 19 to the secondary relay 55 through the lead wire 60 and the ballast 62 therein to ground; and closing the switch 66 will complete a circuit shorting the indicator bulb 43 out of said main circuit.

Assuming that the internal combustion engine becomes self-running in response to closing of the switches 48 and 49, a current energizing the secondary relay 55 will be created by the generator 19. Energization of said secondary relay will cause the contact 54 to become disengaged from the contact 56 and engage the contact 57. Thus the circuit including the starter solenoid 24 will become de-energized and the circuit including the resistance element 77 will become energized to cause the latching arm 101 to be actuated to release the shoulder 116 from the shoulder 115 to permit the spring means of the accelerator linkage to reduce engine speed to value below cold starting speed. Energization of the secondary relay also will cause the contact 73 to become disengaged from the contact 72 and engage the contact 75. Thus the parallel circuit including the heating resistor 69 and the thermistor 70 will become de-energized and removed from being parallel to the primary relay 41, and the resistance bulb 39 will be shorted, permitting or causing full battery voltage to be applied to the circuit then including the primary relay 41 and the block thermostat 45. Essentially, the ballast 62 is for protection of the secondary relay 55 from damage. Resistance of said ballast will increase with increase of engine speed and consequent increase of generator voltage and vise versa.

In the event the internal combustion engine fails to start in response to activation of the primary relay 41, current flowing through the heating resistor 69 and the thermistor 70 will cause the resistance of the before mentioned parallel circuit to reduce to a level that effectively will short out said primary relay 41 thus to interrupt power to the ignition coil 20 and the starter solenoid 24. The resistance bulb 39 will act as a load to dissipate the power in the series combination of said resistance bulb and primary relay with said parallel circuit. Stated otherwise, the resistance bulb 39, or equivalent element, by reason of its characteristic to increase its resistance in response to increasing current flow, will drop an increasing level of voltage as the thermistor 70 reduces in resistance due to heating thus to cause voltage across the primary relay 41 to drop to a level to cause it to fall out or become opened. De-energization of the primary relay 41, in addition to interrupting power to the ignition coil and the starter solenoid, will cause the switch 66 to become opened thus to cause the indicator bulb 43 to be placed in series with a series circuit including said primary relay and the before mentioned parallel circuit and resistance bulb 39. The construction and arrangement will be such that the resistance which said indicator bulb adds to said series circuit will protect the thermistor from self-heating to destruction and also such that the resulting currents will maintain sufficient self-heating of said thermistor to insure the maintenance of current through said primary relay insufficient in amount to cause it to become activated.

Supposing the apparatus is to be employed to start operation of the internal combustion engine in response to falling of the temperature of a passenger or interior space of the automotive vehicle 15 and to cease operation of said engine in response to elevation of the temperature of said passenger or interior space, the pull knob 106 will be withdrawn to cause the master switch 37 to be closed and the switches 79 and 81—82—84 and 91—92—94 will be set in closed position. Whenever thereafter the thermostat 86 shall have become closed, in response to fall of temperature, to connect the lead wire 44 to ground, through the switch 79, the lead wire 80, the switch 81—82—84, the lead wire 85 and said thermostat 86, a main circuit extending from the battery 17 through the lead wire 35 to the master switch 37, thence through the lead wire 38, the resistance bulb 39, the lead wire 40 and the primary relay 41 to the lead wire 42, and thence through the indicator bulb 43, said lead wire 44 and the thermostat 86 to ground, will be closed. The block thermostat 45 will be connected with the main circuit, but will normally be open during those periods when said thermostat 86 is controlling the energization and de-energization of said main circuit. The results obtained in response to energizing the main circuit by closing of the thermostat 86 will be the same as those obtained by closing of the block thermostat 45 hereinbefore described. Assuming that the internal combustion engine commences to operate, thus to cause the secondary relay 55 to be energized, the switch 54–57 will become closed thus to provide power to the heater blower motor 96 through the lead wire 95 and the switch 91—92—94. Upon failure of the internal combustion engine to start, the operation as before described will be repeated.

Supposing the apparatus is to be employed to start operation of the internal combustion engine in response to elevation of the temperature of the passenger or interior space of the automotive vehicle and cessation of operation of said engine is to be in response to lowering of the temperature of said passenger or interior space, the pull knob 106 will be withdrawn to cause the master switch 37 to be closed and the switches 79 and 81—83—84 and 91—93—94 will be set in closed position. Whenever thereafter the thermostat 88 shall have become closed, in response to rise of temperature, to connect the lead wire 44 to ground, through the switch 79, the lead wire 80, the switch 81—83—84, the lead wire 87 and said thermostat 88, a main circuit as before described, including the lead wire 87 and the thermostat 88 instead of the lead wire 85 and the thermostat 86, will be closed. The results obtained in response to energization of the main circuit by closing the thermostat 88 will be the same as those described with respect to closing of the thermostat 86 except that energization of the secondary relay 55 in response to commencement of operation of the engine will cause the switch 54–57 to become closed thus to provided power to the air conditioning blower motor 99 through the lead wire 98 and the switch 91—93—94.

Under any condition of use of the apparatus, power to the main circuit hereinbefore described will be interrupted when the thermal condition is satisfied thus to de-energize the ignition and the blower circuits and accomplish resetting of the apparatus to be capable of functioning as before described, except that the accelerator will be set in the position of higher speed than idling and lower than cold starting for the carburetor satisfactory for starting engines under partially warmed conditions.

In FIG. 4 there is disclosed a pre-setting and interlocking mechanism of modified construction capable of use as a part of an apparatus made according to the invention in lieu of the pre-setting and interlocking mechanism shown in FIG. 3 and hereinbefore described. Parts which are the same as or equivalent to parts illustrated in said FIG. 3 and similarly operative have been given the same reference numerals. Solenoids, indicated 128 and 129, respectively, are fixedly secured in the unit 32. A plunger 130 of the solenoid 128 is pivotally attached, as at 131, to the cylindrical actuator 107, and an insulated plunger 132 of the solenoid 129 is pivotally attached, as at 133, to the latching arm 101.

A lead wire 134, equivalent to the lead wire 76, extends from the fixed contact 57 to the solenoid 129 and a lead wire 135 extends for said solenoid to the latching arm 101.

A lead wire 136 extends from the lead wire 38 to a relay 137 and a lead wire 138 extends from said relay to a switch 139, grounded at 140. The construction and arrangement will be such that the switch 139 will be closed whenever the gear shift is in neutral position and open whenever said gear shift is in any operative position. A lead wire 141 extends from the lead wire 136 to a normally closed switch 142 and a lead wire 143 extends from said last mentioned switch to the solenoid 128 which is grounded at 144.

The master switch 37 is shown in FIG. 4 as when closed in response to withdrawal of the pull knob 106, the shoulder 115 provided by the annular protuberance on the operating rod 104 being engaged back of the shoulder 116 provided by the latching rod 101. The swtich 139 is closed as when the gear shift mechanism is in neutral position. The relay 137 is energized thus to retain the normally closed switch 142 in open position. A closed circuit for said relay is traced from the lead wires 33 and 136 to the relay and thence by the lead wire 138 and the switch 139 to ground. Upon opening of the switch 139, which is to occur whenever the gear shift mechanism is placed in any operative position, the relay 137 will become de-energized and the switch 142 will become closed thus to provide a circuit through the solenoid 128 traced from the lead wires 136 and 141 to said switch and thence by the lead wire 143 to said solenoid. Energization of the solenoid 128 will cause the plunger 130 to be pulled inwardly thus to move the cylindrical actuator 107 toward the right in said FIG. 4 to be ridable at 120 along the latching arm 101 to cause it to be rotated downwardly and release the shoulder 116 from the shoulder 115 with the results as set forth in connection with the diclosure of FIG. 3.

The solenoid 129 will become energized in response to energization of the secondary relay 55, caused by current created by the generator 19 and causing the contact 54 to become disengaged from the contact 56 and engaged with the contact 57, a circuit for said solenoid 129 being traced from the lead wire 134 through the solenoid, the lead wire 135, the latching arm 101 and the operating rod 104 to ground. Energization of said solenoid will cause the plunger 132 to be pulled inwardly thus to rotate said latching arm downwardly to release the shoulder 116 from the shoulder 115 and break the energizing circuit for the solenoid 129 with the results as set forth in connection with the disclosure of FIG. 3. A compression coil spring 145 is for urging the plunger 132 outwardly when the solenoid 129 becomes de-energized.

In FIGS. 5 to 8, inclusive, a further modified construction of pre-setting and interlocking mechanism, suitable for use as part of an apparatus incorporating features and characteristics of the invention in replacement of the pre-setting and interlocking mechanisms as shown in FIG. 3 and FIG. 4 is disclosed.

A unit 150, disclosed in FIGS. 5 and 6, equivalent to the unit 32, supports a master switch 151, the same as or equivalent to the master switch 37, and lead wires 152 and 153, the same as or equivalent to the lead wires 35 and 38, respectively, extend to and from said master switch 151. A slidable contactor 154, the same as or equivalent to the movable contactor 108, of the master switch 151 is to be engageable with and disengageable from fixed contactors thereof. A latching arm 155 is pivotally, insulatively mounted, as at 156, on the unit 150, and a solenoid 157 is fixedly secured, as at 158, on said unit. A plunger 159 of said solenoid is pivotally atatched, as at 160, to an end of the latching arm 155 opposite a shoulder 161 thereof. A compression coil spring 162 on said plunger normally retains the plunger at its outermost position relative to the solenoid. A lead wire 163, equivalent to the lead wires 76 and 134, extends from the fixed contact 57 to the solenoid 157 and a lead wire 164 extends from said solenoid to the latching arm 155.

An operating lever 165, a master switch control lever 166 and an actuating cam 167 of the disclosure of FIGS. 5 to 8 are rotatably mounted, as at 168, on the unit 150, and a latching lever 169 is rotatably mounted on said unit, as at 170.

The actuating cam 167 is contiguous with the adjacent surface of said unit 150, the latching lever 169 also is contiguous with said adjacent surface and in the plane of said actuating cam, the master switch control lever 166 is contiguous with the forward surfaces of the actuating cam and said latching lever and extends to position clear of said forward surfaces, and the operating lever 165 is in contiguous relation to the forward surface of the master switch control lever.

A tongue 171 of or on said operating lever is engageable selectively with a stop element 172 of or on the latching lever 169 and a stop element 173 of or on said master switch control lever. Also, the master switch control lever 166 includes a stop surface 174 engageable with a stop element 175 of or on said latching lever at the side of said control lever opposite the stop element 173, and the master switch control lever includes spaced stop elements 176 engageable with opposed surfaces of the slidable contactor 154 thus to cause the master switch 151 selectively to be opened and closed.

A cable 177 secured to the operating lever 165, at 178, extends through a guide tube 179, and a pull knob 180 is fixed to an end of said cable spaced from said operating lever.

A cable 181 extends from the actuating cam 167 to a gear shift linkage 182, and a cable 183 will extend from the operating lever 165 to an accelerator linkage such as 28.

A tension coil spring 184, extending between and connected to the operating lever 165 and the latching lever 169, retains the actuating cam 167 and said latching lever in engagement, and a tension coil spring 185, between and connected to said operating lever and a lower portion of the master switch control lever 166, is for causing said master switch control lever to become operative to turn on the master switch in response to withdrawal of the pull knob 180. A tension coil spring 186 has one end thereof secured, at 187, to an extension on the actuator cam 167 and the opposite end thereof secured, as at 188, to the unit 150.

The master switch 151 is to be capable of becoming closed in response to withdrawal of the pull knob 180 (thus to cause a shoulder 189 provided by the operating lever 165 to become engaged back of the shoulder 161 of the latching arm 155 as in FIG. 5 of the drawings) when the actuating cam 167 is situated, by the tension coil spring 186, to correspond with neutral position for the gear shift mechanism as in FIG. 6. The pull on the control lever 166 in response to rotation of the operating lever 165 in clockwise direction to cause the master switch to become closed will be through the tension coil spring 185 to cause the slidable contactor 154 to be moved from open position as in FIG. 7 to closed position as in FIGS. 5 and 6, and upon engagement of said shoulder 189 back of said shoulder 161 the accelerator linkage to which the cable 183 is attached will be preset to provide a carburetor setting higher than for idling speed of the engine and approximate for cold starting. The stop element 172 of or on the latching lever 169 is for retaining the operating lever 165 in a position of higher speed than idling and lower than cold starting for the carburetor. A spring means (not shown) of or for the accelerator linkage will rotate said operating lever in counterclockwise direction upon its release by the latching arm 155 thus to cause the tongue 171 to become engaged with said stop element 172.

The construction and arrangement will be such that the actuating cam 167 will cause the latching lever 169 to be rotated, counterclockwise in FIGS. 7 and 8, whenever the gear shift mechanism is placed in an operative position thus to release the stop element 172 from said tongue 171 and permit the operating lever 165 to be rotated counterclockwise by the spring means of the actuator linkage thus to engage the tongue 171 of said operating lever with the stop element 173 of or on the master switch control lever 166 and cause the master switch to be opened as in FIG. 7.

The construction and arrangement also will be such that the master switch 151 cannot be actuated to closed position when the gear shift mechanism is in an operative position. See FIG. 8 of the drawings where the actuating cam 167 has been rotated counterclockwise in response to placing the gear shift mechanism 182 in an operative position to cause the stop element 175 of or on the latching lever 169 to become engaged with the stop surface 174 of or on the control lever 166 thus to preclude the possibility of closing of the master switch when the gear shift mechanism is in any operative position.

The solenoid 157 will become energized in response to energization of the secondary relay 55, a circuit for said solenoid being traced from the lead wire 163 through the solenoid, the lead wire 164, the latching arm 155 and the operating lever 165 to ground. Energization of said solenoid will cause the plunger 159 to be pulled inwardly thus to rotate said latching arm to release the shoulder 161 from the shoulder 189 and break the energizing circuit for said solenoid with the results as hereinbefore set forth. The compression coil spring 162 will operate to move the plunger 159 outwardly when the solenoid 157 becomes de-energized.

In FIG. 9 there is disclosed a still further modified construction of pre-setting and interlocking mechanism capable of employment as part of the apparatus in lieu of the pre-setting and interlocking mechanisms hereinbefore described. Parts which are the same as or equivalent to parts illustrated in FIGS. 5 to 8, inclusive, and similarly operative have been given the same reference numerals. A solenoid 190 is to be fixedly supported, as on the unit 150, and a plunger 191 of said solenoid is pivotally attached, as at 192, to an extension on the actuating cam 167. A lead wire 193 extends from a normally closed switch such as controlled by the relay 137 to the solenoid 190 and a lead wire 194 extends from said solenoid to ground.

As set forth in connection with the solenoid 128, the solenoid 190 will be de-energized whenever the gear shift mechanism is in neutral position to cause a switch such as 139, disclosed in FIG. 4 to be closed, and said solenoid 190 will become energized whenever the gear shift mechanism is in any operative position to cause said switch to be opened. Energization of the solenoid 190 will cause the plunger 191 to be pulled inwardly thus to rotate the actuating cam 167 in counterclockwise direction to swing the latching lever 169 downwardly thus to release the stop element 172 from the tongue 171 of or on the operating lever 165.

What is claimed is:

1. In an apparatus for starting and ceasing operation of an internal combustion engine including an engine starter, an ignition coil, a battery for energizing said engine starter and ignition coil, respectively, and an electric generator to be driven by said internal combustion engine, a primary relay, an electric circuit therefor including said battery, a switch for making and breaking said electric circuit to cause said primary relay to be energized and de-energized, first and second switches to be closed in response to energization of said primary relay to complete energizing circuits including the battery and said engine starter and ignition coil, respectively, a secondary relay and a third switch to be closed in response to energization of the primary relay to complete an energizing circuit for said secondary relay including said generator, energization of said secondary relay being adapted to cause said circuit for said engine starter to be interrupted and de-energization of said primary relay causing said circuits for said engine starter and ignition coil to be de-activated.

2. In an apparatus for starting and ceasing operation of an internal combustion engine including an engine starter, an ignition coil, a battery for energizing said engine starter and ignition coil, respectively, and an electric generator to be driven by said internal combustion engine, a relay, an electric circuit therefor including said battery, a resistance element in said electric circuit, a switch for making and breaking said electric circuit to cause the relay to be energized and de-energized, a circuit parallel to said relay to become energized in response to energization of the relay, a resistor such as a thermistor in said parallel circuit having negative coefficient of resistance change with change of temperature, first and second switches to be closed in response to energization of said relay to complete energizing circuits including the battery and said engine starter and ignition coil, respectively, means actuable in response to operation of said generator to cause said circuits for said engine starter and parallel circuit to be interrupted, current flowing through the resistance element in said electric circuit and through the resistor in said parallel circuit being adapted to cause resistance of the parallel circuit to become reduced to a level that effectively will short out said relay thus to interrupt power to said engine starter and ignition coil and de-energization of said relay causing the circuits for said engine starter and ignition coil to become de-activated.

3. The combination as specified in claim 2 wherein the resistance element in said electric circuit has characteristic to increase its resistance in response to increasing current flow.

4. The combination as specified in claim 3 wherein said resistance element in the electric circuit is adapted to drop an increasing level of voltage as said resistor in the parallel circuit reduces in resistance due to heating thus to cause voltage across said relay to drop to a level to cause it to become inoperative.

5. In an apparatus for starting and ceasing operation of an internal combustion engine including an engine starter, an ignition coil, a battery for energizing said engine starter and ignition coil, respectively, and an electric generator to be driven by said internal combustion engine, a primary relay, an electric circuit therefor including said battery, a resistance element in said electric circuit having characteristic to increase its resistance in response to increasing current flow, a switch for making and breaking said electric circuit to cause said primary relay to become energized and de-energized, a circuit parallel to said primary relay to become energized in response to energization of the primary relay, a resistor in said parallel circuit having negative coefficient of resistance change with change of temperature, first and second switches to be closed in response to energization of said primary relay to complete energizating circuits including the battery and said engine starter and ignition coil, respectively, a secondary relay and an energizing circuit for said secondary relay including said generator, energization of said secondary relay being adapted to cause said circuit for said engine starter to be interrupted, current flowing through the resistance element in said electric circuit and through the resistor in said parallel circuit being adapted to cause resistance of the parallel circuit to become reduced to a level that effectively will short out said primary relay thus to interrupt power to said engine starter and ignition coil and de-energization of said primary relay causing said circuits for said engine starter and ignition coil to be de-activated.

6. The combination as specified in claim 5 wherein said resistance element in the electric circuit is adapted to drop an increasing level of voltage as said resistor in the parallel circuit reduces in resistance due to heating thus to cause voltage across said primary relay to drop to a level to cause it to become inoperative.

7. The combination as specified in claim 2, an indicator element in said electric circuit, and means actuable in response to de-energization of said relay to cause said indicator element to be placed in series with a series circuit including said relay, parallel circuit and resistance element.

8. In an apparatus for starting and ceasing operation of an internal combustion engine of an automotive vehicle, said engine including a carburetor, and engine starter, an ignition coil, a battery for energizing said engine starter and ignition coil, respectively, and an electric generator to be driven by said internal combustion engine and said vehicle including a gear shift mechanism and an accelerator linkage, a relay, an electric circuit therefor including said battery, a switch for making and breaking said electric circuit to cause said relay to be energized and de-energized, means for retaining said accelerator linkage in a first position to provide a carburetor setting higher than for idling speed of the engine and appropriate for cold starting, means for rendering said switch incapable of becoming situated in closed position to cause the electric circuit to be made save when said gear shift mechanism is in a neutral position, first and second switches to be closed in response to energization of said relay to complete energizating circuits including the battery and said engine starter and ignition coil, respectively, means for retaining the accelerator linkage in a second position of higher speed than for idling and lower than for cold starting of said carburetor, and means actuable in response to operation of said generator to cause said circuit for said engine starter to be interrupted and said accelerator linkage to be released from said first position thus to be permitted to be situated in said second position, de-energization of said relay causing said circuits for said engine starter and ignition coil to be de-activated.

9. In an apparatus for starting and ceasing operation of an internal combustion engine of an automotive vehicle, said engine including a carburetor, an engine starter, an ignition coil, a battery for energizing said engine starter and ignition coil, respectively, and an electric generator to be driven by said internal combustion engine and said vehicle including a gear shift mechanism and an accelerator linkage, a relay, an electric circuit therefor including said battery, a switch for making and breaking said electric circuit to cause said relay to be energized and de-energized, means for rendering said switch incapable of becoming situated in closed position to cause the electric circuit to be made save when said gear shift mechanism is in a neutral position, means for actuating said accelerator linkage to a first position to provide a carburetor setting higher than for idling speed of the engine and appropriate for cold starting, means for completing energizing circuits including the battery and said engine starter and ignition coil, respectively, means for retaining the accelerator linkage in a second position of higher speed than for idling and lower than for cold starting of said carburetor, and means actuable in response to operation of said generator to cause said circuit for said engine starter to be interrupted and said accelerator linkage to be released from said first position to become capable of being situated in said second position, de-energization of said relay causing said circuits for said engine starter and ignition coil to be de-activated.

10. In an apparatus for starting and ceasing operation of an internal combustion engine including an engine starter a battery for energizing said engine starter, and an electric generator to be driven by said internal combustion engine, a primary relay, an electric circuit therefor including said battery, a switch for making and breaking said electric circuit to cause said primary relay to be energized and de-energized, a first switch to be closed in response to energization of said primary relay to complete energizing a circuit including the battery and said engine starter, a secondary relay and a second switch to be closed in response to energization of the primary relay to complete an energizing circuit for said secondary relay including said generator, energization of said secondary relay being adapted to cause said circuit for said engine starter to be interrupted and de-energization of said primary relay causing said circuit for said engine starter to be de-activated.

11. In an apparatus for starting and ceasing operation of an internal combustion engine including an engine starter, a battery for energizing said engine starter, and an electric generator to be driven by said internal combustion engine, a relay, an electric circuit therefor including said battery, a resistance element in said electric circuit, a switch for making and breaking said electric circuit to cause the relay to be energized and de-energized, a circuit parallel to said relay to become energized in response to energization of the relay, a resistor such as a thermistor in said parallel circuit having negative coefficient of resistance change with change of temperature, a first switch to be closed in response to energization of said relay to complete an energizing circuit including the battery and said engine starter, means actuable in response to operation of said generator to cause said circuits for said engine starter and parallel circuit to be interrupted, current flowing through the resistance element in said electric circuit and through the resistor in said parallel circuit being adapted to cause resistance of the parallel circuit to become reduced to a level that effectively will short out said relay thus to interrupt power to said engine starter and de-energization of said relay causing the circuit for said engine starter to become de-activated.

12. The combination as specified in claim 11 wherein the resistance element in said electric circuit has characteristic to increase its resistance in response to increasing current flow.

13. The combination as specified in claim 12 wherein said resistance element in the electric circuit is adapted to drop an increasing level of voltage as said resistor in the parallel circuit reduces in resistance due to heating thus to cause voltage across said relay to drop to a level to cause it to become inoperative.

References Cited in the file of this patent

UNITED STATES PATENTS

| 1,233,961 | Bijur | July 17, 1917 |
|---|---|---|
| 2,691,110 | Lincoln | Oct. 5, 1954 |
| 2,710,926 | Charles | June 14, 1955 |
| 2,952,782 | Woyden | Sept. 13, 1960 |
| 2,975,296 | Dominguez-Rego | Mar. 14, 1961 |

UNITED STATES PATENT OFFICE
CERTIFICATE OF CORRECTION

Patent No. 3,102,961                          September 3, 1963

Andrew Kuehn III

It is hereby certified that error appears in the above numbered patent requiring correction and that the said Letters Patent should read as corrected below.

Column 8, line 55, for "approximate" read -- appropriate --; column 11, line 19, for "energizating" read -- energizing --.

Signed and sealed this 25th day of February 1964.

(SEAL)
Attest:

ERNEST W. SWIDER                        EDWIN L. REYNOLDS

Attesting Officer                       Acting Commissioner of Patents